United States Patent
Ohira et al.

(10) Patent No.: US 6,694,949 B2
(45) Date of Patent: Feb. 24, 2004

(54) IGNITION CONTROL DEVICE FOR INTERNAL COMBUSTION ENGINE

(75) Inventors: Shigeyuki Ohira, Kuwana (JP); Toshihiro Saga, Okazaki (JP); Akihiro Hara, Tokai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/420,866

(22) Filed: Apr. 23, 2003

(65) Prior Publication Data

US 2003/0209231 A1 Nov. 13, 2003

(30) Foreign Application Priority Data

May 8, 2002 (JP) ......................................... 2002-133143

(51) Int. Cl.⁷ ............................................... F02P 5/145
(52) U.S. Cl. .................. 123/406.58; 123/617; 123/631
(58) Field of Search ............................. 123/406.58, 617, 123/631

(56) References Cited

U.S. PATENT DOCUMENTS

| | | | | |
|---|---|---|---|---|
| 4,491,121 A | * | 1/1985 | Miura et al. ................. | 123/631 |
| 4,909,229 A | * | 3/1990 | Hashizume .................. | 123/631 |
| 5,079,945 A | * | 1/1992 | Hansen et al. ............... | 123/617 |
| 6,035,826 A | * | 3/2000 | Matsuoka .................... | 123/617 |
| 6,404,188 B1 | * | 6/2002 | Ricks ..................... | 123/406.58 |

FOREIGN PATENT DOCUMENTS

| JP | 6-330839 | 11/1994 |
|---|---|---|
| JP | 2001-152905 | 5/2001 |

* cited by examiner

*Primary Examiner*—Erick Solis
(74) *Attorney, Agent, or Firm*—Nixon & Vanderhye P.C.

(57) ABSTRACT

A rotor of a crankshaft has protrusions. A timing sensor produces a rotation leading signal and a rotation trailing signal. A control unit measures a previous signal production interval and a present signal production interval based on the rotation signals, and determines that the rotor is in the forward rotation if an inequality of $T_n/T_{n-1} \geq K$ holds alternately but consecutively by four times on the side of the rotation trailing signal. As a result, at the time of manufacturing the rotor, the degree of freedom of design in the positional relations of the protrusions can be enhanced to control the ignition timing precisely and stably.

4 Claims, 5 Drawing Sheets

IGNITION CONTROL DEVICE FOR INTERNAL COMBUSTION ENGINE

CROSS REFERENCE TO RELATED APPLICATION

This application relates to and incorporates herein by reference Japanese Patent Application No. 2002-133143 filed on May 8, 2002.

FIELD OF THE INVENTION

The present invention relates to an ignition control device for an internal combustion engine which rotates a crankshaft of the internal combustion engine having a cylinder in the forward direction and in the backward direction.

BACKGROUND OF THE INVENTION

In a small-sized vehicle such as a scooter or a snow mobile, a reverse gear is not provided so as to reduce the size and lighten the weight. In this vehicle incapable of selecting the backward run by changing the gear, it is conceived to realize the backward run by reversing the rotating direction of the crankshaft of the internal combustion engine.

In an ignition system disclosed in JP-A-2001-152905, the crankshaft of an internal combustion engine can be rotated in the forward direction and in the backward direction at a low cost by using one sensor to reduce the number of parts and the number of assembling step. However, this ignition system is restricted by a condition, under which the center spacings, as taken in the rotating direction, of a pair of protrusions (or teeth) as the position detecting portions of a rotor rotating while facing the sensor, have to be substantially equal at three portions. Unless this restricting condition is satisfied, an erroneous determination tends to occur in the forward/backward rotating direction.

In case a similar ignition system is applied to an internal combustion engine having one cylinder (or a single cylinder), it is also desired for determining the forward/backward rotating direction quickly to arrange a pair of protrusions at three portions of the rotor. At the time of manufacturing the rotor, the degree of freedom of design is decreased in the positional relation of the protrusions.

SUMMARY OF THE INVENTION

It is therefore an object of the present invention to provide an ignition control device for an internal combustion engine, which can achieve a precise and stable ignition performance by a simple control in accordance with the running conditions even in either rotating direction, in case the center spacings of a pair of protrusions in the rotating direction are equal at least at two portions.

According to an ignition control device for an internal combustion engine, a pair of first position detecting portions and two pairs of second position detecting portions are formed on the outer circumference of a rotor, and only the length of one of the first position detecting portions is made different. The rotating direction of the crankshaft of the internal combustion engine having one cylinder is quickly determined on the basis of the detection result by one position detecting device with respect to one pair of first position detecting portions and two pairs of second position detecting portions, so that the ignition timing of the internal combustion engine is controlled precisely and stably according to the running condition.

Preferably, a rotation leading signal and a rotation trailing signal of the individual position detecting portions are produced on the basis of detection signals. Merely by comparing the previous signal production interval and present signal production interval on the base of those rotation leading signal and rotation trailing signal, it is found whether the rotating direction determination of the crankshaft of the internal combustion engine is proper. Therefore, the operation load on the rotating direction determination is reduced.

Preferably, the rotating direction of the internal combustion engine is determined, when the state, in which present signal production interval is longer than the last preceding signal production interval of the rotation leading signal or the rotation trailing signal, continues alternately but consecutively by predetermined number of times, on the basis of either the ratio of the signal production intervals of the rotation leading signals or the ratio of the signal production intervals of the rotation trailing signals.

BRIEF DESCRIPTION OF THE DRAWINGS

The above and other objects, features and advantages of the present invention will become more apparent from the following detailed description made with reference to the accompanying drawings. In the accompanying drawings.

DETAILED DESCRIPTION OF THE EMBODIMENT

Figure 1:
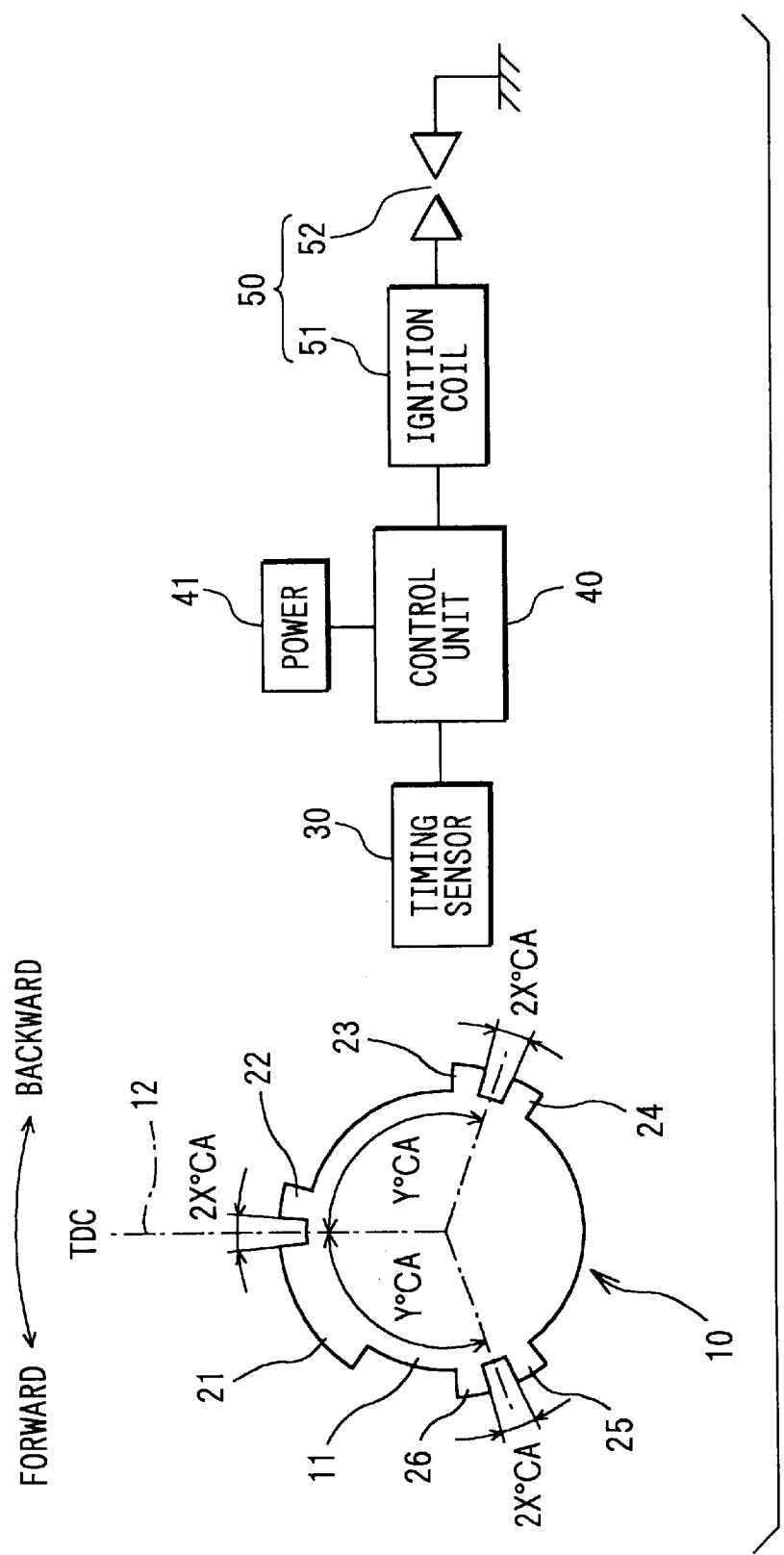
FIG. 1 is a block diagram showing schematically an ignition system, to which an ignition control device for an internal combustion engine according to one embodiment of the present invention is applied.

Referring to FIG. 1, an ignition system controls ignition timing of a known two-cycle single-cylinder internal combustion engine, in which a crankshaft is rotated as a piston housed in a cylinder reciprocates. The ignition system is constructed to include a rotor 10, a timing sensor 30 and a control unit 40.

The rotor 10 is rotates with the crankshaft to make one revolution for one revolution of the crankshaft. The rotor 10 is provided with a disc-shaped rotor body 11 and protrusions 21, 22, 23, 24, 25 and 26, which are so formed on the outer circumference of the rotor body 11 as to protrude radially outward to act as position detecting portions of these, the protrusion 21 is formed longer in the rotating direction than the remaining protrusions 22 to 26.

The length of the protrusion 21 is so set that its rotation leading side may be positioned at the forward rotation time of the internal combustion engine substantially at the middle between the rotation leading side of the protrusion 26 and the rotation leading side of the protrusion 22. The protrusions 21 and 22 are so arranged to across the TDC (Top Dead Center) interposed between the compression stroke and the explosion stroke of one cylinder of the internal combustion engine that they are spaced by X [degrees CA (crankshaft angle)], e.g., 5 [degrees CA] from the TDC 12 in the forward and backward rotating direction. Moreover, the protrusions 23 and 24 and the protrusions 25 and 26 are individually spaced by 2X [degrees CA] from each other in the rotating direction. The center of the protrusions 23 and 24 and the center of the protrusions 25 and 26 are spaced at equal angles of Y [degrees CA], e.g., 110 [degrees CA] from the TDC 12 of the rotor body 11. Here, these protrusions 23, 24, 25 and 26 are so arranged that the rotating direction of the rotor 10 rotated in synchronism with the crankshaft of the internal combustion engine may be quickly detected.

Figure 2:
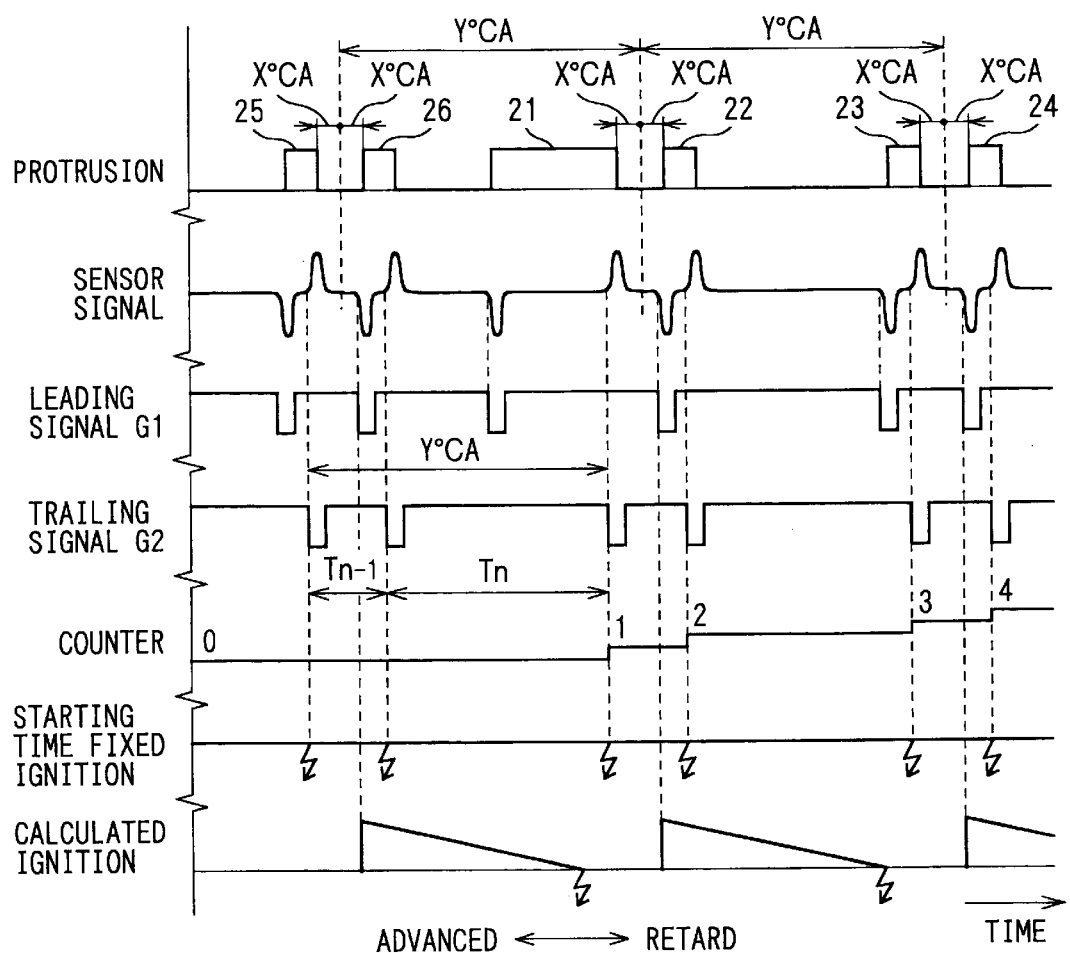
FIG. 2 is a time chart showing transitional states of various sensor signals and various control quantities at the forward rotation time of a crankshaft of the internal combustion engine in the ignition system of FIG. 1.
Figure 3:
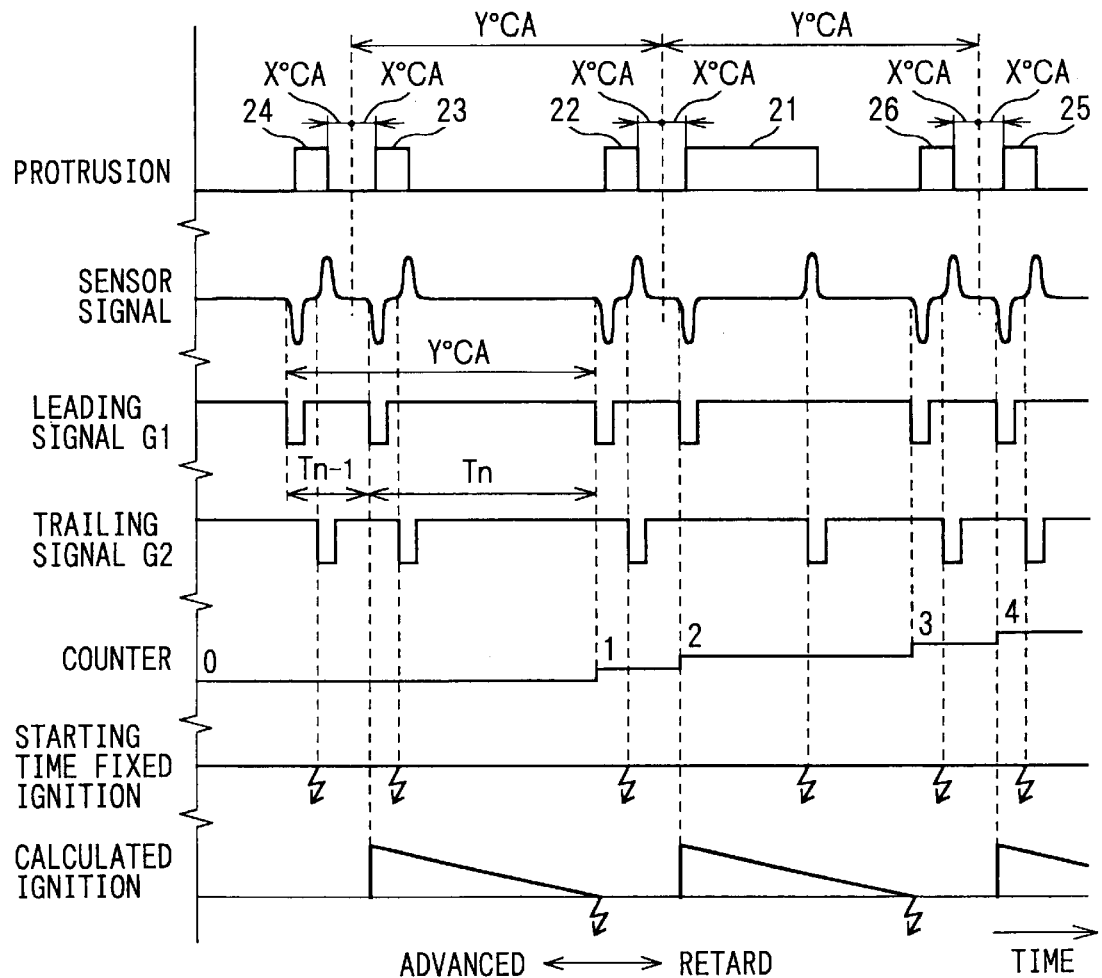
FIG. 3 is a time chart showing transitional states of the various sensor signals and the various control quantities at the backward rotation time of the crankshaft of the internal combustion engine in the ignition system of FIG. 1.

The timing sensor 30 is a magnetic pickup for outputting timing sensor signals as detection signals on the rotation leading side and the rotation trailing side of the protrusions 21 to 26, as shown in FIGS. 2 and 3. Here, the timing sensor 30 may be a Hall element, an MRE (magnetic resistance element) or the like. The control unit 40 is constructed to include a CPU acting as a well-known central processing unit for executing various calculation operations, a ROM storing with a control program, a control map or the like, a RAM for storing various data or the like and a control circuit, and is supplied with an electric power from a power source 41.

An ignition mechanism 50 matches one cylinder of the internal combustion engine and is constructed to include an ignition coil 51 and an ignition plug 52. At the ignition timing of each cylinder, a switching signal is sent from the control unit 40 to the ignition coil 51 so that a spark is generated at the ignition plug 52 by the electromotive force generated in the ignition coil 51.

In FIGS. 2 and 3, the lefthand side is assumed to be located in the advancing direction, i.e., on the rotation leading side, and the righthand side is located in the retarding direction, i.e., on the rotation trailing side. The timing sensor 30 outputs positive/negative signals, as shown in FIG. 2 and FIG. 3, on the rotation leading sides and the rotation trailing sides of the individual protrusions 21 to 26. In the control circuit of the control unit 40, a rotation leading signal G1 or a pulse signal on the rotation leading side is produced on the basis of a negative signal outputted from the timing sensor 30, and a rotation trailing signal G2 or a pulse signal on the rotation trailing side is produced on the basis of a positive signal outputted from the timing sensor 30.

In case the rotating direction of the internal combustion engine is to be reversed from forward to backward or from backward to forward while the internal combustion engine is running, for example, a reverse switch (not shown) is pushed. Here, the rotating direction of the crankshaft of the internal combustion engine cannot be reversed till the engine rotation speed drops.

Figure 4:
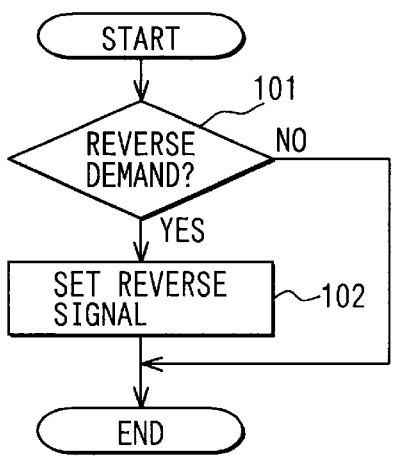
FIG. 4 is a flow chart showing a processing procedure of a reverse switch determination in a control unit used in the ignition control device of the internal combustion engine according to the embodiment of the present invention.

The control unit 40 is programmed to execute a processing procedure of the reverse switch determination as shown in a flow chart of FIG. 4. Here, this reverse switch determining routine is executed repeatedly for every time periods in the main routine of the control unit 40.

At step 101 in FIG. 4, it is determined whether or not a reverse demand has been made. When the determining condition of step 101 is satisfied, that is, when the reverse switch is pushed by a driver, the routine advances to step 102, at which a reverse flag is turned on for setting the reverse signal, and this routine is ended. When the determining condition of step 101 is not satisfied, that is, when the reverse switch is not pushed, this routine ends.

Figure 5:
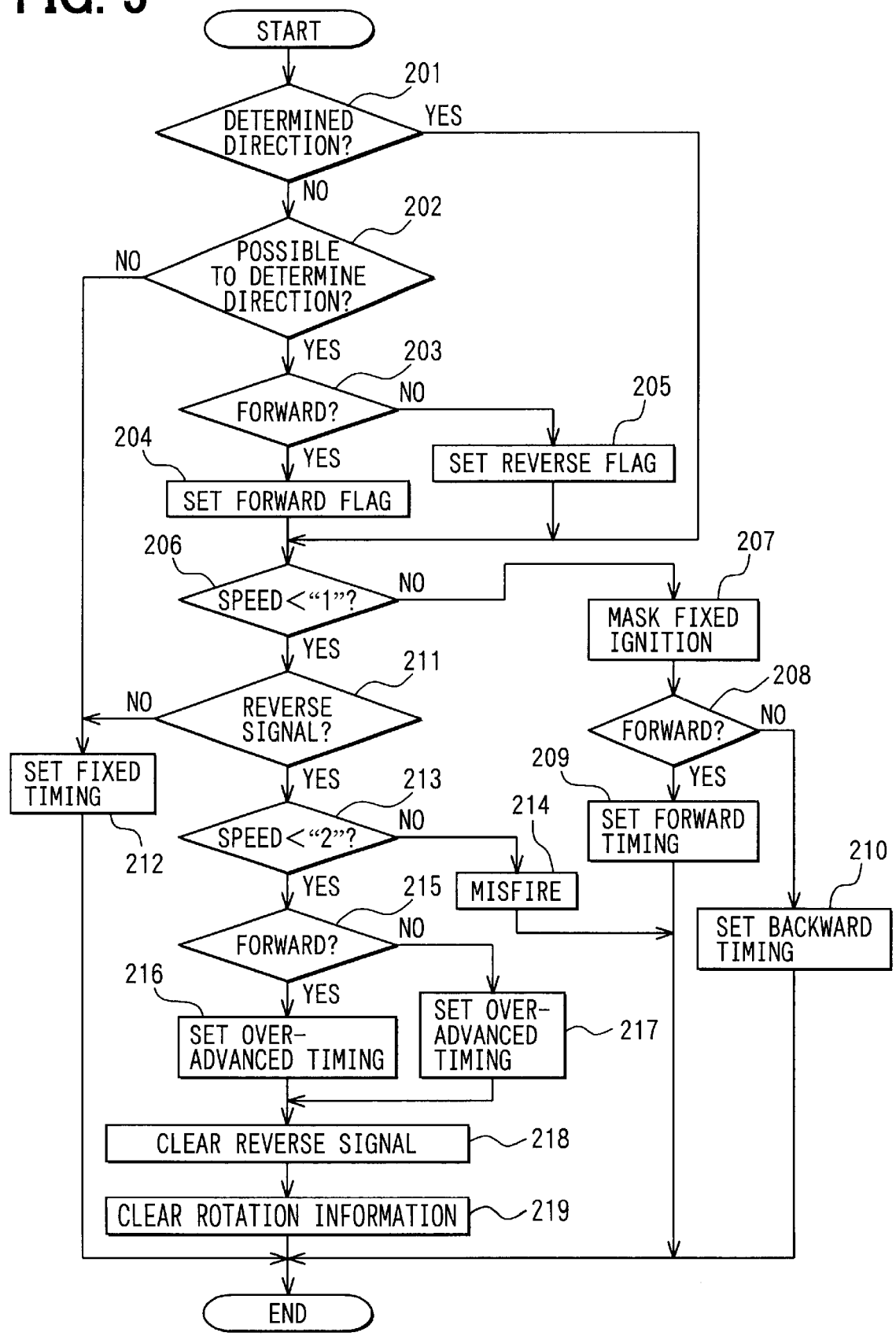
FIG. 5 is a flow chart showing a processing procedure of a rotating direction switching control in the control unit of the ignition control device of the internal combustion engine according to the embodiment of the present invention.

The control unit 40 is further programmed to execute a flow chart of FIG. 5, which is a processing procedure of a rotating direction switching control of the crankshaft. Here, this rotating direction switching control routine is executed repeatedly for every interrupt, as caused in response to the generation of the rotation leading signal G1 and the rotation trailing signal G2.

At step 201, it is determined whether or not the rotating direction of the crankshaft of the internal combustion engine has been determined. When this determining condition of step 201 is not satisfied, the routine advances to step 202, at which it is determined whether or not it is possible to determine the rotating direction of the crankshaft of the internal combustion engine.

Here, the rotating direction of the crankshaft of the internal combustion engine is determined as follows.

The intervals between the last but one and the last signals and between the last and this time signals are designated as Tn−1 and Tn, respectively, for the rotation leading signal G1 and the rotation trailing signal G2.

<1> When Tn−1<Tn is detected, a counter is set to the initial value "1", and an increment is started.

<2> After the start of increment of the counter, the counter is incremented by "1" at each fall of the rotation leading signal G1 or the rotation trailing signal G2.

<3> When the counter value is odd, the rotating direction is determined with the number (e.g., four in the present embodiment) of consecutive satisfactions of the following inequality (1). Here, letter K designates a determination constant preset according to the length of each protrusion in the rotating direction.

$$Tn/Tn-1 \geq K \tag{1}$$

When the determination condition of step 202 is satisfied, that is, when the inequality (1) is satisfied consecutively four times on the side of the rotation leading signal G1 or the rotation trailing signal G2, it is determined that the rotating direction of the crankshaft of the internal combustion engine can be determined, and the routine advances to step 203. At this step 203, it is determined whether or not the rotating direction of the crankshaft of the internal combustion engine is "forward".

When it is determined at step 203 that the inequality (1) is satisfied consecutively four times on the side of the rotation trailing signal G2, it is determined that the rotating direction is "forward", and the routine advances to step 204, at which the forward flag is set (ON). When it is determined at step 202 that the inequality (1) is satisfied consecutively four times on the side of the rotation leading signal G1, it is determined that the rotating direction is "backward". Then, the routine advances to step 205, at which the reverse flag is set (ON).

When the forward flag is "ON" at step 204, when the backward flag is "ON" at step 205 or when the rotating direction of the crankshaft of the internal combustion engine was determined at step 201, the routine advances to step 206. At this step 206, it is determined whether or not the engine rotation speed of the internal combustion engine is less than a predetermined rotation speed "1". When the determining condition of step 206 is not satisfied, that is, when the engine rotation speed is higher than the predetermined value "1", the routine advances to step 207 for inhibiting the ignition plug 52 from being fixedly ignited by the control circuit at every timing of generation of the rotation trailing signal G2. At step 207, a mask signal is produced for canceling the rotation trailing signal G2. Next, the routine advances to step 208, at which it is determined whether or not the rotating direction is "forward".

When the determining condition of step 208 is satisfied, that is, when the rotating direction is "forward", the routine advances to step 209, at which the counter value is set to the ignition timing according to the running state of the "forward" rotating direction of the internal combustion engine, and the present routine is ended. When the determined condition of step 208 is not satisfied, that is, when the rotating direction is "backward", the routine advances to step 210, at which the counter value is set to the ignition timing according to the running state of the "backward" rotating direction of the internal combustion engine, and the present routine is ended. At this time, when the calculated ignition signal is "OFF", as shown in FIG. 2 and FIG. 3, that is, when the counter value is "0 (zero)", another interrupt routine is started so that the ignition plug 52 is ignited.

By thus detecting the reference position from the forward/backward determination result and with respect to the long protrusion 21, the rotational position, at which the count-down for outputting the ignition signal to one cylinder of the internal combustion engine is to be started, can be specified in advance according to the rotating direction. When the rotating direction and the rotational position to start the count-down for outputting the ignition signal are known, moreover, the ignition timing set at the forward rotation time or the backward rotation time can be outputted so that the output timing of the ignition signal can be obtained precisely and stably.

When the determining condition of step 206 is satisfied, that is, when the engine rotation speed is lower than the predetermined rotation speed "1", on the other hand, the routine advances to step 211, at which it is determined whether or not the reverse signal is present. When the determining condition of step 211 is not satisfied, that is, the reverse flag as the reverse signal is "OFF", or when the determining condition of step 202 is not satisfied, that is when the inequality (1) is not satisfied consecutively by four times on the side of the rotation leading signal G1 or the rotation trailing signal G2 so that the rotating direction of the crankshaft of the internal combustion engine cannot be determined, the routine advances to step 212.

At step 212, with the fixed ignition by the starting time fixed ignition signal, the ignition plug 52 is ignited at a fixed timing (crankshaft angle) by the control circuit at every time of occurrence of the rotation trailing signal G2 which corresponds to the timing sensor signal of the TDC 12 of one cylinder or the X [degrees CA] before and after TDC ±Y [degrees CA].

Thus, when the control program by the control unit 40 does not act at the starting time of the internal combustion engine, the ignition plug 52 is fixedly ignited with the starting time fixed ignition signal corresponding to each occurrence of the rotation trailing signal G2, as shown in FIGS. 2 and 3. At the starting time, specifically, the ignition signals are outputted to correspond to the protrusions 21 to 26 of the BTDC (Before Top Dead Center) X [degrees CA] independently of the rotating direction and as the demanded initial ignition timing so that the stable rotations can be achieved. Here in FIG. 2 and FIG. 3, the ignition plug 52 is ignited with the starting time fixed ignition signal before and after the TDC 12 of one cylinder and before and after TDC ±Y [degrees CA]. Even if the ignition is made on the side angularly retarded from the TDC 12 of one cylinder and the TDC ±Y [degrees CA], the fuel has already been burned so that the rotation of the crankshaft of the internal combustion engine is not obstructed.

When the determining condition of step 211 is satisfied, that is, when the reverse signal is present so that the reverse switch has been pushed, on the other hand, the routine advances to step 213, at which it is determining whether or not the engine rotation speed is less than a predetermined rotation speed "2". Here, this predetermined rotation speed "2" is lower than the predetermined rotation speed "1". When determining condition of step 213 is not satisfied, that is, the engine rotation speed is not lower than the predetermined rotation speed "2", more specifically, the routine advances to step 214. Judging that the engine rotation speed is still higher, the ignition plug 52 is not ignited but misfired at step 214 to lower the engine rotation speed, and the present routine is ended.

When the determining condition of step 213 is satisfied, that is, when the engine rotation speed is lower than the predetermined rotation speed "2", it is determined that the crankshaft of the internal combustion engine can be reversed, and the routine advances to step 215, at which it is determined whether or not the rotating direction is "forward". When the determining condition of step 215 is satisfied, that is, when the rotating direction is "forward", the routine advances to step 216, at which an over-advanced ignition for the forward rotation is executed.

When the determining condition of step 215 is not satisfied, that is, when the rotating direction is "backward", on the other hand, the routine advances to step 217, at which the over-advanced ignition for the backward rotation is executed. As a result, the ignition plug 52 is ignited at a position advanced from the ordinary ignition timing, so that the piston is pushed back before the piston reaches the TDC 12 of one cylinder thereby to reverse the rotating direction of the crankshaft of the internal combustion engine. After the operation of step 216 or step 217, the routine advances to step 218, at which the reverse flag is cleared. Next, the routine advances to step 219, at which the rotational information such as the forward flag, the backward flag or the engine rotation speed is cleared, and the present routine is ended.

Figure 6:
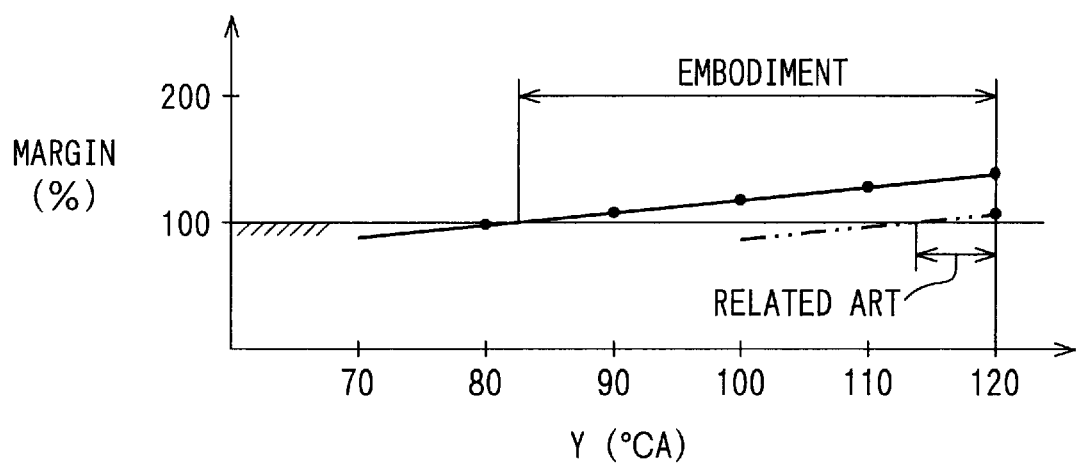
FIG. 6 is a characteristic diagram showing a determination margin in the ignition system of FIG. 1.

In the above embodiment, when K=2 and the engine rotation speed NE=1,000 [rpm] in the inequality (1), for example, the Y [degrees CA] in the determination with the rotation trailing signal G2 at the forward rotation time can be set to an arbitrary value within the range which is shown as the degree of freedom of design according to the present embodiment in FIG. 6. Here, the range of the Y [degrees CA] shown as the degree of freedom of design according to the present embodiment in FIG. 6 is a mirror symmetry 120 [degrees CA]. Here, the determination margin is defined by the product of the quotient of the calculation result of $T_n/T_{n-1}$ in the inequality (1), as divided by the value K in the inequality (1), and "100".

An erroneous determination occurs if that determination margin is less than 100 [%]. Therefore, the Y [degrees CA] can be set within such a range of about 82 [degrees CA] to about 158 [degrees CA] as gives 100 [%] or higher determination margin. Therefore, the range of the degree of freedom of design according to the present embodiment can be made wider than that of the example of the related art based on the condition (as indicated by a double-dotted line in FIG. 6) for, for example, K=4 in an inequality of $\{(T_{n-1}+T_n)/T_{n-1}\} \geq K$ for $T_{n-1} < T_n$ or $\{(T_{n-1}+T_n)/T_n\} \geq K$ for $T_{n-1} > T_n$ according to JP-A-2001-152905.

Thus, the ignition control device of the internal combustion engine of the present embodiment can rotate the crankshaft of the internal combustion engine having one cylinder freely in the forward direction and in the backward direction.

What is claimed is:

1. An ignition control device for an internal combustion engine having a single cylinder and a crankshaft, comprising:

a rotor rotatable in synchronism with the crankshaft of the internal combustion engine and provided on its outer circumference with a plurality of position detecting portions;

position detecting means for detecting the plurality of position detecting portions sequentially in accordance with the rotation of the rotor; and ignition control means for controlling an ignition timing of the internal combustion engine on the basis of a detection result of the position detecting means, wherein the position detecting portions includes a pair of first position detecting portions arranged at a spacing of a predetermined angle in forward and backward rotating directions across an angular position of a top dead center positioned between a compression stroke and an explosion stroke of the cylinder, and a pair of second position detecting portions arranged at a spacing of a predetermined angle in the forward and backward directions across angular positions of two portions of a circumference of about one divided by an integer number (1/N) in the forward and backward rotating directions with respect to the angular position of the top dead center, such that only the length of one of the first position detecting portions of the first position detecting portions and the second position detecting portions is different.

2. An ignition control device for an internal combustion engine as set forth in claim 1, wherein the ignition control means produces a rotation leading signal and a rotation trailing signal for each of the position detecting portions on the basis of detection signals by the position detecting means.

3. An ignition control device for an internal combustion engine as set forth in claim 2, wherein the rotating direction of the internal combustion engine is discriminated, when the state, in which a signal production interval is longer than the last preceding signal production interval of the rotation leading signal or the rotation trailing signal, continues alternately but consecutively by a predetermined number of times, on the basis of a ratio ($Tn/Tn-1$) of the signal production intervals ($Tn$, $Tn-1$).

4. An ignition control device for an internal combustion engine as set forth in claim 1, wherein the integer number is 3.

* * * * *